United States Patent
Wu

(10) Patent No.: US 10,942,372 B2
(45) Date of Patent: Mar. 9, 2021

(54) METHOD AND DEVICE FOR CONTROLLING GLASSES, AND STORAGE MEDIUM

(71) Applicant: Beijing Xiaomi Mobile Software Co., Ltd., Beijing (CN)

(72) Inventor: Ke Wu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 239 days.

(21) Appl. No.: 15/951,177

(22) Filed: Apr. 12, 2018

(65) Prior Publication Data

US 2018/0329231 A1 Nov. 15, 2018

(30) Foreign Application Priority Data

May 12, 2017 (CN) .......................... 201710336022.9

(51) Int. Cl.
*G02C 7/08* (2006.01)
*G02C 11/00* (2006.01)
(Continued)

(52) U.S. Cl.
CPC ............. *G02C 7/083* (2013.01); *G01C 21/02* (2013.01); *G02C 7/081* (2013.01); *G02C 11/10* (2013.01); *G06T 7/73* (2017.01); *G06T 7/80* (2017.01)

(58) Field of Classification Search
CPC ........ G02C 7/083; G02C 7/081; G02C 11/10; G02C 7/061; G01C 21/02; G06T 7/80; G06T 7/73
See application file for complete search history.

(56) References Cited

U.S. PATENT DOCUMENTS

2012/0127422 A1 5/2012 Tian et al.
2016/0282635 A1* 9/2016 Yang ...................... G02B 3/14
(Continued)

FOREIGN PATENT DOCUMENTS

CN 106125333 A 11/2016
CN 106164982 A 11/2016
(Continued)

OTHER PUBLICATIONS

The extended European search report issued in European application No. 18168924.1, dated Oct. 2, 2018.
(Continued)

*Primary Examiner* — William R Alexander
*Assistant Examiner* — Ephrem Z Mebrahtu
(74) *Attorney, Agent, or Firm* — Jun He Law Offices P.C.; James J. Zhu

(57) ABSTRACT

The present disclosure relates to a method and a device for controlling glasses, and a storage medium. The method includes: acquiring positioning information of a user wearing the glasses and naked eye visual acuity values of the user; determining target diopters of lenses of the glasses according to the naked eye visual acuity values of the user and the positioning information of the user using a diopter mapping table, wherein the lenses are used to correct the user's visual acuity, and the diopter mapping table is a preset corresponding relationship among positioning information, naked eye visual acuity values and target diopters; and adjusting diopters of the lenses to the target diopters.

12 Claims, 5 Drawing Sheets

(51) Int. Cl.
  *G01C 21/02* (2006.01)
  *G06T 7/80* (2017.01)
  *G06T 7/73* (2017.01)

(56) References Cited

U.S. PATENT DOCUMENTS

2018/0356652 A1* 12/2018 Shibuya ................. G02C 11/10
2020/0133025 A1*  4/2020 Muramatsu ............. G02C 7/00

FOREIGN PATENT DOCUMENTS

| | | |
|---|---|---|
| DE | 102014208981 A1 | 11/2015 |
| DE | 102015214671 A1 | 2/2017 |
| EP | 2833196 A1 | 2/2015 |
| EP | 3115831 A1 | 1/2017 |
| KR | 20170004399 A | 1/2017 |
| WO | 2015094191 A1 | 6/2015 |
| WO | 2017009540 A1 | 1/2017 |

OTHER PUBLICATIONS

The First Office Action in corresponding Chinese application No. 201710336022.9, dated Sep. 30, 2018.

* cited by examiner

METHOD AND DEVICE FOR CONTROLLING GLASSES, AND STORAGE MEDIUM

CROSS-REFERENCE TO RELATED APPLICATION

This application is based upon and claims priority to Chinese patent application No. 201710336022.9 filed May 12, 2017, which is incorporated herein by reference in its entirety.

TECHNICAL FIELD

The present disclosure relates to the technical field of wearable devices, and more particularly, to a method and a device for controlling glasses, and a storage medium.

BACKGROUND

Glasses may be used to correct a user's vision problems, such as myopia, hyperopia, astigmatism, presbyopia or strabismus. Taking myopia as an example, if the user often uses his or her eyes in a short distance, such as reading a book or watching a computer, the eyes will be constantly performing adjustment, and the adjustment system of the eyes will be always in tension. After a long duration, the eyes may feel not comfortable, and may have visual fatigue symptoms such as tears, dryness, foreign body sensation, blurred vision and so on. Severe cases will lead to decreased visual acuity. Accordingly, when viewing things in a short distance for a long time, the user with myopia may wear glasses that have slightly lower diopters than diopters determined in optometry. Thus, since the diopters are reduced, it may reduce the degree of adjustment performed by the eyes during usage of eyes in a short distance, the visual fatigue symptoms may be significantly mitigated and even eliminated, and the burden of the eyes may be lowered. When the user views things at a long distance (farther than 5 meters), the eyes basically need not perform adjustment. In this case, in order to view things more clearly, the user needs to wear glasses that have slightly higher diopters than the diopters of the glasses worn for viewing things in a short distance.

SUMMARY

In order to solve the above problem existing in the related art, embodiments of the present disclosure provide a method and a device for controlling glasses, and a storage medium. The technical solution is as follows.

According to a first aspect of the embodiments of the present disclosure, there is provided a method for controlling glasses, including:

acquiring positioning information of a user wearing the glasses and naked eye visual acuity values of the user;

determining target diopters of lenses of the glasses according to naked eye visual acuity values of the user and the positioning information of the user using a diopter mapping table, wherein the lenses are used to correct the user's visual acuity, and the diopter mapping table is a preset corresponding relationship among positioning information, naked eye visual acuity values and target diopters; and adjusting diopters of the lenses to the target diopters.

According to a second aspect of the embodiments of the present disclosure, there is provided a device for controlling glasses, including:

a processor; and a memory for storing instructions executable by the processor;

wherein the processor is configured to:

acquire positioning information of a user wearing the glasses and naked eye visual acuity values of the user;

determine target diopters of lenses of the glasses according to the naked eye visual acuity values of the user and the positioning information of the user using a diopter mapping table, wherein the lenses are used to correct the user's visual acuity, and the diopter mapping table is a preset corresponding relationship among positioning information, naked eye visual acuity values and target diopters; and adjust diopters of the lenses to the target diopters.

According to a third aspect of the embodiments of the present disclosure, there is provided a computer readable storage medium having stored thereon computer programs that, when being executed by a processor, perform steps of any of the method and its optional implementations according to the above first aspect.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
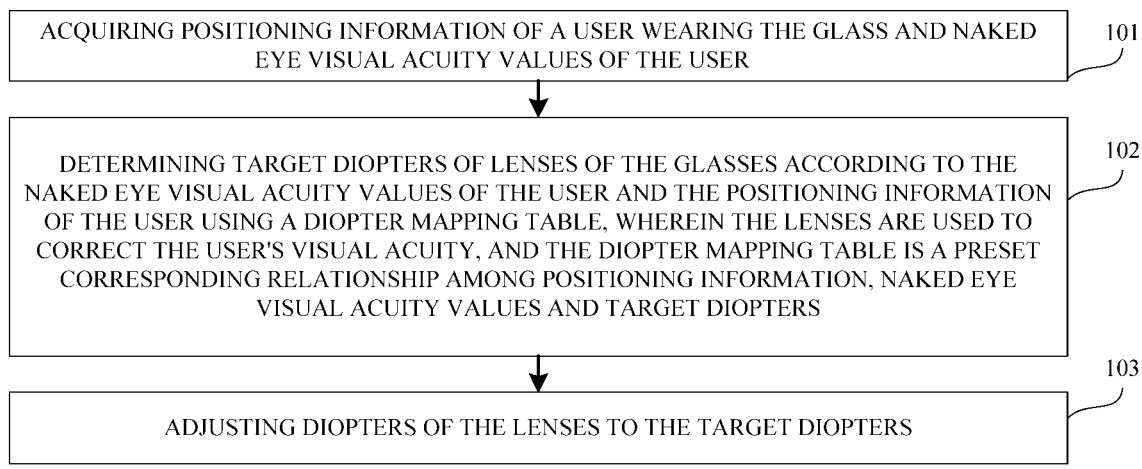
FIG. 1 is a flow chart illustrating a method for controlling glasses according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

Glasses may be used to correct a user's vision problems, such as myopia, hyperopia, astigmatism, presbyopia or strabismus. In the related art, taking myopia as an example, when a user performs optometry, a distance such as 5 meters or more is generally taken as a reference distance for the optometry. When the user with myopia often uses his or her eyes in a short distance, such as reading a book or watching a computer, the user may be in a distance from the book or the computer much closer than 5 meters. In order to view an object in a short distance clearly, the eyes will constantly perform adjustment. The closer to the book or the computer the eyes are, the higher the degree of the adjustment performed by the eyes will be. After a long duration, the adjustment system of the eyes will be always in tension, the eyes may feel not comfortable, and may have visual fatigue symptoms such as tears, dryness, foreign body sensation, blurred vision and so on. Severe cases will lead to decreased visual acuity. Accordingly, when viewing things in a short distance for a long time, the user with myopia may wear glasses that have slightly lower diopters than diopters determined in optometry. Thus, since the diopters are reduced, it may reduce the degree of the adjustment performed by the eyes during usage of eyes in a short distance, the visual fatigue symptoms may be significantly mitigated and even eliminated, and the burden of the eyes may be lowered. When the user views things at a long distance (farther than 5 meters), the eyes basically need not perform adjustment. In this case, in order to view things more clearly, the user needs to wear glasses that have slightly higher diopters than the diopters of the glasses worn for viewing things in a short distance. Then, the user has to prepare glasses of different diopters for different environments, which is neither economic nor convenient, and has a poor user experience.

In order to solve the above problem, an embodiment of the present disclosure provides a method for controlling glasses. The method includes: acquiring positioning information of a user wearing the glasses and naked eye visual acuity values of the user; determining target diopters of lenses of the glasses according to the naked eye visual acuity values of the user and the positioning information using a diopter mapping table, the lenses being used to correct the user's visual acuity, and the diopter mapping table being a preset corresponding relationship among positioning information, naked eye visual acuity values and target diopters; and adjusting diopters of the lenses to the target diopters. In the technical solution provided by the embodiment of the present disclosure, the diopters of the lenses of the glasses may be automatically adjusted based on the positioning information of the user. It may meet the different demands of the users on the diopters of lenses of glasses in different environments and solve the problem that the user has to prepare glasses of different diopters for different environments. It is convenient and economic. Moreover, the process of adjusting the diopters of the glasses may be performed highly automatically and without human intervention.

FIG. 1 is a flow chart illustrating a method for controlling glasses according to an exemplary embodiment. As shown in FIG. 1, the method includes the following steps 101 to 103.

In step 101, positioning information of the user is acquired.

For example, the method may be performed by glasses or a terminal. For example, the glasses may be glasses used to correct visual acuity problem of the user, such as myopia, hyperopia, astigmatism, presbyopia or strabismus. The terminal may be a smart phone, a computer, or a vehicle-mounted mobile terminal and other electronic equipment. In a case where the method is performed by a terminal, the terminal may communicate with the glasses using a short-range communication technology such as Bluetooth, or using WiFi, 2G/3G/4G/5G, or a combination thereof.

For example, the positioning information of the user is used to indicate location information of the current location of the user or the glasses of the user, such as longitude and latitude information, place names, landforms, urban/suburban areas, indoor/outdoor information and the like.

For example, implementation of acquiring the positioning information of the user may include acquiring the positioning information of the user with preset positioning technology. The preset positioning technology may include at least any one or combination of: positioning technology based on Global Positioning System (GPS), positioning technology based on BeiDou, positioning technology based on identification of the current location area of the user's terminal, positioning technology based on wireless access point (AP), and positioning technology based on base stations.

In step 102, target diopters of lenses of the glasses are determined according to the naked eye visual acuity values of the user and the positioning information of the user using a diopter mapping table. The lenses are used to correct the user's visual acuity. The diopter mapping table is a preset corresponding relationship among positioning information, naked eye visual acuity values and target diopters.

For example, the diopter mapping table is acquired previously. After the positioning information of the user is acquired, the target diopters corresponding to naked eye visual acuity values of the user and the positioning information may be acquired by querying the diopter mapping table. The diopter mapping table is a preset corresponding relationship among positioning information, naked eye visual acuity values and target diopters. By previously setting the diopter mapping table, the target diopters corresponding to naked eye visual acuity values of the user and the positioning information may be acquired from the diopter mapping table. It is convenient and easy to implement, and may improve the accuracy of determining the target diopters. Optionally, if the positioning information indicates that the user is currently indoors, the target diopters corresponding to the positioning information may be slightly lower than the diopters of the glasses determined in optometry, so as to reduce the degree of the adjustment performed by the eyes during usage of the eyes in a short distance, and lower the burden of the eyes. If the positioning information indicates that the user is currently outdoors, the target diopters corresponding to the positioning information may be higher than diopters corresponding to indoors, so as to view things more clearly.

For example, in order to avoid the problem that the determined target diopters are inaccurate due to the positioning error, after the positioning information of the user is acquired, the environment feature information of the user's current location may also be acquired, and it is determined whether the environment feature information matches with the positioning information. When the environment feature information matches with the positioning information, it may be determined that the accuracy of the positioning information is high. Then, the target diopters of the lenses of the glasses may be determined according to the naked eye visual acuity values of the user and the positioning information. When the environment feature information does not match with the positioning information, it may indicate that the accuracy of the positioning information is low, and the process will go to step 101 to acquire the positioning information again, or acquire the positioning information manually entered. Then, again, it is determined whether the environment feature information matches with the positioning information. When the environment feature information matches with the positioning information, the target diopters of the lenses of the glasses are determined according to the naked eye vision test values of the user and the positioning information.

For example, acquiring environment feature information of the user's current location may include: controlling a camera of the glasses to capture an environment image of the user's current location, and analyzing the environment image to obtain the environment feature information of the user's current location; or, controlling a camera of the terminal of the user to capture an environment image of the user's current location, and analyzing the environment image to obtain the environment feature information of the user's current location. For example, the environment feature information may be natural feature information such as a landscape, a mountain, a river, or the like, and may also be feature information such as furniture, a computer, a person, a street view or the like. For example, positioning information indicating indoor may match with environment feature information of a computer or furniture, and positioning information indicating a mountain may match with environment feature information of a mountain.

In step 103, diopters of the lenses are adjusted to the target diopters.

For example, in case where the method is performed by a terminal, after the terminal determines the target diopters of the lenses of the glasses according to the naked eye visual acuity values of the user and the positioning information of the user, a diopter adjustment command carrying the target diopters is sent to the glasses of the user, and upon receipt of the diopter adjustment command, the glasses adjusts the diopters of the lenses to the target diopters.

For example, each lens of the pair of glasses may consist of two adjustable layers, and the diopter of the lens may be adjusted by adjusting the relative positions of the two layers of the lens. The diopter adjustment may be achieved by other methods, which is not specifically limited here.

In the technical solution provided by the embodiments of the present disclosure, the diopters of the lenses of the glasses may be automatically adjusted based on the positioning information of the user. It may meet the different demands of the user on the diopters of lenses of glasses in different environments and solve the problem that the user has to prepare glasses of different diopters for different environments. It is convenient and economical. Moreover, the process of adjusting the diopters of the glasses may be performed highly automatically and without human intervention. Thus, it may improve the user experience.

Figure 2:
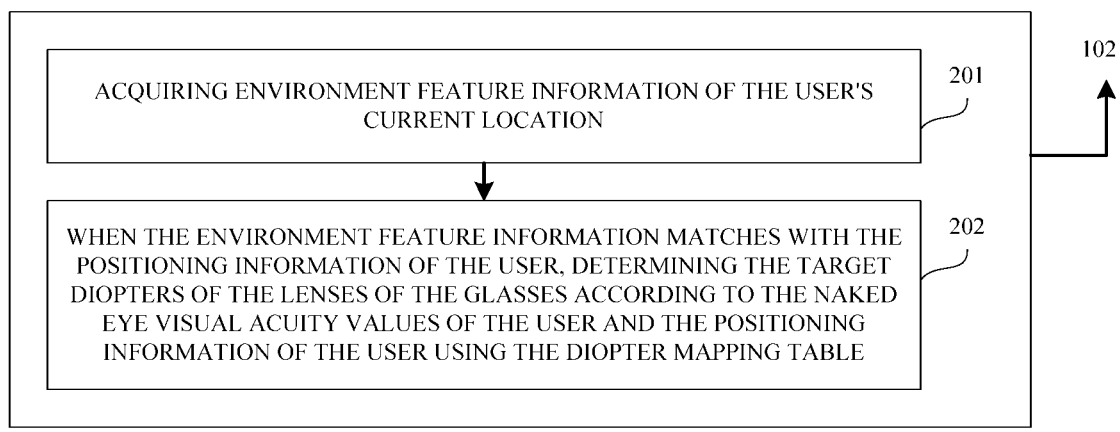
FIG. 2 is a flow chart illustrating step 102 in a method for controlling glasses according to an exemplary embodiment.

In one possible embodiment, as shown in FIG. 2, the step 102 as shown in FIG. 1 may be implemented as steps 201 to 202.

In step 201, environment feature information of the user's current location is acquired.

For example, in order to avoid the problem that the determined target diopters are inaccurate due to positioning errors, after the positioning information of the user is acquired, the environment feature information of the user's current location may also be acquired, and it is determined whether the environment feature information matches with the positioning information. For example, the environment feature information may be natural feature information such as a landscape, a mountain, a river, or the like, and may also be feature information such as furniture, a computer, a person, a street view or the like. For example, positioning information indicating indoor may match with environment feature information of a computer or furniture, and positioning information indicating a mountain may match with environment feature information of a mountain.

When the environment feature information matches with the positioning information, it may be determined that the accuracy of the positioning information is high. Then, the target diopters of the lenses of the glasses may be determined according to the naked eye visual acuity values of the user and the positioning information of the user.

When the environment feature information does not match with the positioning information, it may indicate that the accuracy of the positioning information is low, and require acquiring the positioning information again or having the positioning information manually entered. Then, again, it is determined whether the environment feature information matches with the positioning information.

In step 202, when the environment feature information matches with the positioning information, the target diopters of the lenses are determined according to the naked eye visual acuity values of the user and the positioning information of the user using the diopter mapping table.

In the above embodiment of the present disclosure, after the positioning information of the user is acquired, the environment feature information of the user's current location is also acquired, and it is determined whether the environment feature information matches with the positioning information. Only when the environment feature information matches with the positioning information, the target diopters of the lenses of the glasses are determined according to the naked eye visual acuity values of the user and the positioning information of the user. Thus, it may avoid the problem that the determined target diopters are inaccurate due to positioning errors and may improve the accuracy of the determined target diopters.

In one possible embodiment, the step 201 as shown in FIG. 2 may be implemented as: controlling a camera of the glasses to capture an environment image of the user's current location, and analyzing the environment image to obtain the environment feature information of the user's current location; or controlling a camera of the terminal of the user to capture an environment image of the user's current location, and analyzing the environment image to obtain the environment feature information of the user's current location.

Hereinafter, the implementation will be described in detail with reference to some embodiments.

Figure 3:
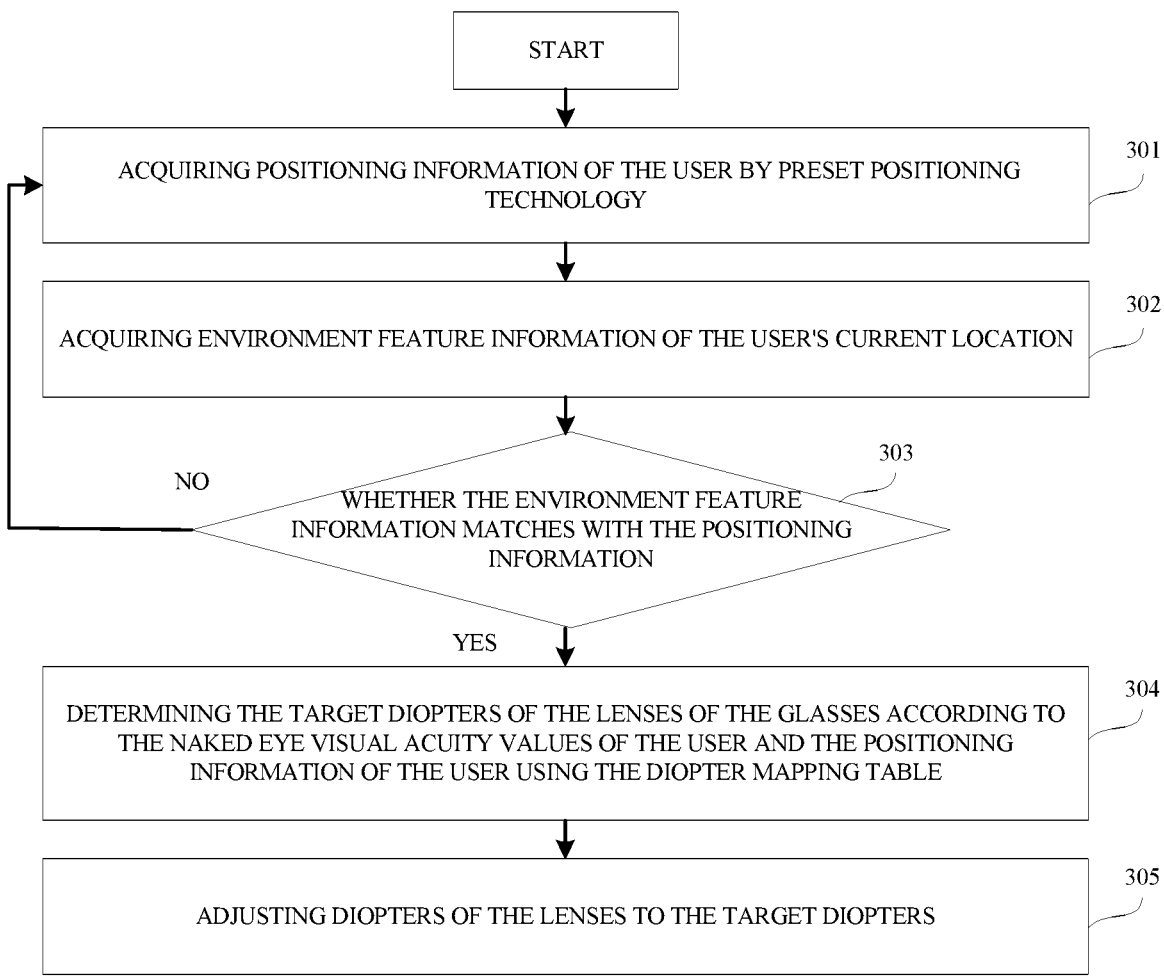
FIG. 3 is a flow chart illustrating a method for controlling glasses according to an exemplary embodiment.

FIG. 3 is a flow chart illustrating a method for controlling glasses according to an exemplary embodiment. The method is performed by the glasses or a terminal. As shown in FIG. 3, the method includes the following steps.

In step 301, positioning information of the user is acquired with preset positioning technology.

The preset positioning technology includes at least one of: positioning technology based on GPS, positioning technology based on BeiDou, positioning technology based on identification of the current location area of the user's terminal, positioning technology based on AP, and positioning technology based on base stations.

In step 302, environment feature information of the user's current location is acquired.

For example, a camera of the glasses is controlled to capture an environment image of the user's current location, and the environment image is analyzed to obtain the environment feature information of the user's current location; or, a camera of the terminal of the user is controlled to capture an environment image of the user's current location, and the environment image is analyzed to obtain the environment feature information of the user's current location.

In step 303, it is determined whether the environment feature information matches with the positioning information of the user; when the environment feature information matches with the positioning information, the process goes to step 304; and when the environment feature information does not match with the positioning information of the user, the process goes to step 301.

In step 304, when the environment feature information matches with the positioning information of the user, the target diopters of the lenses are determined according to the naked eye vision test values of the user and the positioning information using the diopter mapping table.

The diopter mapping table is a preset corresponding relationship among positioning information, naked eye visual acuity values and target diopters. The lenses are used to correct the user's visual acuity.

In step 305, diopters of the lenses are adjusted to the target diopters.

In the technical solution provided by the embodiments of the present disclosure, the diopters of the lenses of the glasses may be automatically adjusted based on the positioning information of the user. It may meet the different demands of the users on the diopters of lenses of glasses in different environments and solve the problem that the user has to prepare glasses of different diopters for different environments. It is convenient and economical. Moreover, the process of adjusting the diopters of the glasses may be performed highly automatically and without human intervention. Thus, it may improve the user experience.

As a possible embodiment, a solution for automatically adjusting diopters of glasses according to different environments is provided herein. The solution may realize automatically adjusting diopters according to different environments. For example, when the user is in the office and faces a computer for a long time, the computer is in a short distance from the glasses. In this case, the diopters of the glasses may be automatically adjusted to be low, as long as the user may clearly see the screen of the computer. Thus, it may minimize the degree of the adjustment performed by the eye in a short distance, and lower the burden of the eyes. When the user is outdoors, and needs to clearly view scenes farther away, the target diopters may be automatically adjusted to be high at this time so as for the user to clearly view the scenes. The solution is specifically disclosed as follows.

In a first step, the environment information of the user is acquired. That is, geographical location information of the user is acquired. The current geographical location of the user may be determined through any one or combination of the following manners.

1) GPS positioning.
2) Beidou navigation.
3) Geographical group of the user's phone number.
4) WiFi hotspots (such as APs, wireless routers, etc.). With the number of the WiFi hotspots (such as APs, wireless routers, etc.) gets increasingly large, it is more likely that at least one AP signal may be received at any spot in a city. As long as a hotspot is powered on, regardless of how it is encrypted, the hotspot will transmit a signal to the surroundings. The signal contains a unique global ID of the hotspot. Even at a long distance from the hotspot, the presence of the hotspot may be monitored though the hotspot may not be accessed to. The hotspot is generally fixed and rarely changes its location. In this regard, the client terminal may monitor which hotspots present nearby, detect the strength of the signal of each hotspot, and then send such information to a server supporting software positioning. The server may query the coordinate of each hotspot recorded in a data base, calculate and obtain the specific location of the client terminal. Then, the server may inform the specific location information to the client terminal.

5) Base station positioning. The location of the user may be determined by acquiring the location of the base station used by the user.

In a second step, after the geographical location of the user is acquired, in order to avoid positioning errors, a camera on the glasses is used to further confirm the user environment. For example, if in the first step, it is determined that the geographical location of the user is at the user's home, the content seen by the user which is captured by the camera should be the interior decoration and the like, and should not be a mall with huge population or other places. If in the first step, it is determined that the geographical location of the user is in a mountain area outdoors, the content captured by the camera should be natural scene.

In a third step, according to the environment information of the user and the naked eye visual acuity of the user, target diopters for automatically adjusting the glasses, which match with the environment information and the naked eye vision test visual acuity, are determined. The following table illustrates an exemplary corresponding relationship among environment information of the user, the naked eye visual acuity of the user and the target diopters for automatically adjusting the glasses.

| environment information of user | eye visual acuity of user | Target diopters for automatically adjusting glasses |
|---|---|---|
| indoors (room smaller than 100 square meters) | myopia 0.4 | 2 diopters |
| indoors (large performance venue or gymnasium) | myopia 0.4 | 3 diopters |

The technical solution provided by the embodiment of the present disclosure may meet the different demands of the users on the diopters of lenses of glasses in different environments. It is convenient and economical.

The following is a device embodiment of the present disclosure and may be used to perform the method embodiment of the present disclosure.

Figure 4:
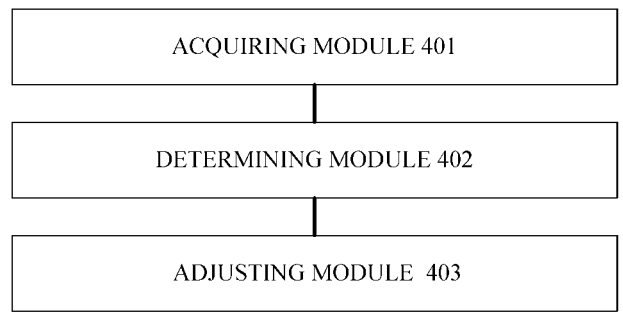
FIG. 4 is a block diagram illustrating a device for controlling glasses according to an exemplary embodiment.

FIG. 4 is a block diagram illustrating a device for controlling glasses according to an exemplary embodiment. The device may be implemented by various manners. For example, all of the components of the device may be implemented in glasses or a terminal. Alternatively, the components of the device may be coupled to the glasses or the terminal. The device may be implemented by software, hardware or a combination thereof, to perform the above method. As shown in FIG. 4, the device for controlling glasses includes: an acquiring module 401, a determining module 402 and an adjusting module 403.

The acquiring module 401 is configured to acquire positioning information of a user wearing the glasses and naked eye visual acuity values of the user.

The determining module 402 is configured to determine target diopters of lenses according to naked eye visual acuity values of the user and the positioning information of the user using a diopter mapping table. The lenses are used to correct the user's visual acuity, and the diopter mapping table is a preset corresponding relationship among positioning information, naked eye visual acuity values and target diopters.

The adjusting module 403 is configured to adjust diopters of the lenses to the target diopters.

In the device for controlling glasses provided by an embodiment of the present disclosure, the acquiring module 401 is configured to acquire positioning information of a user wearing the glasses and naked eye visual acuity values of the user. The determining module 402 is configured to determine target diopters of lenses according to naked eye visual acuity values of the user and the positioning information of the user using a diopter mapping table, the lenses being used to correct the user's visual acuity. The adjusting module 403 is configured to adjust diopters of the lenses to the target diopters. The diopters of the lenses of the glasses may be automatically adjusted based on the positioning information of the user. It may meet the different demands of the users on the diopters of lenses of glasses in different environments and solve the problem that the user has to prepare glasses of different diopters for different environments. It is convenient and economical. Moreover, the process of adjusting the diopters of the glasses may be performed highly automatically and without human intervention. Thus, it may improve the user experience.

Figure 5:
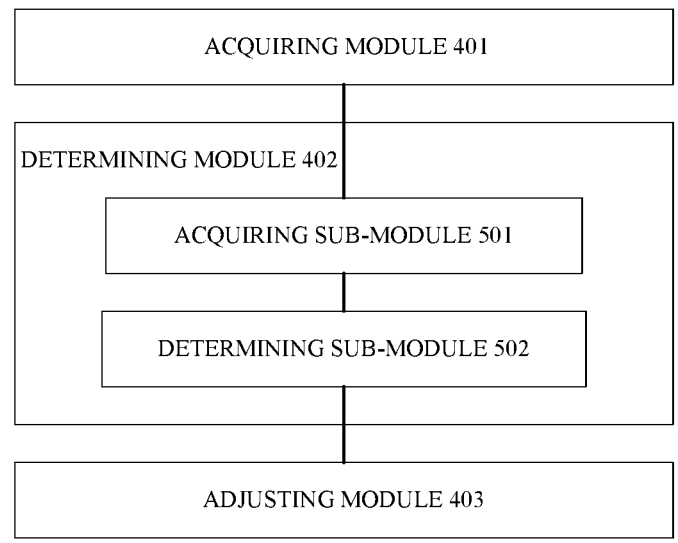
FIG. 5 is a block diagram illustrating a device for controlling glasses according to an exemplary embodiment.

In one possible embodiment, as shown in FIG. 5, the device for controlling glasses as shown in FIG. 4 may also configure the determining module 402 to include:

an acquiring sub-module 501 configured to acquire environment feature information of the user's current location; and a determining sub-module 502 configured to, when the environment feature information matches with the positioning information, determine the target diopters of the lenses according to the naked eye visual acuity values of the user and the positioning information of the user using the diopter mapping table.

In one possible embodiment, the acquiring sub-module 501 is configured to control a camera of the glasses to capture an environment image of the user's current location, and analyze the environment image to obtain the environment feature information of the user's current location; or the acquiring sub-module 501 is configured to control a camera of a terminal of the user to capture an environment image of the user's current location, and analyze the environment image to obtain the environment feature information of the user's current location.

In one possible embodiment, the acquiring module 401 is configured to acquire the positioning information of the user by preset positioning technology. The preset positioning technology includes at least one of: positioning technology based on GPS, positioning technology based on BeiDou, positioning technology based on identification of the current location area of the user's terminal, positioning technology based on AP, and positioning technology based on base stations.

Figure 6:
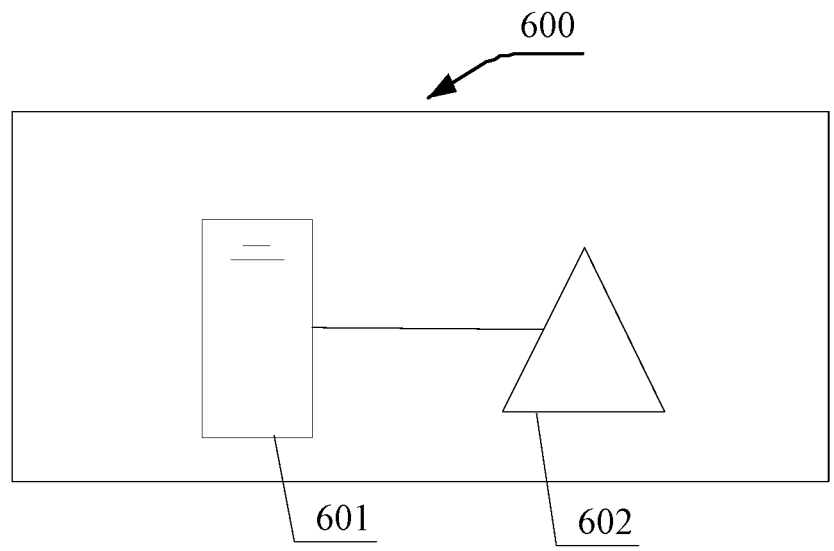
FIG. 6 is a block diagram illustrating a device for controlling glasses according to an exemplary embodiment.

FIG. 6 is a block diagram illustrating a device 600 for controlling glasses according to an exemplary embodiment. The device 600 may be implemented by various manners. For example, all of the components of the device may be implemented in glasses or a terminal. Alternatively, the components of the device may be coupled to the glasses or the terminal. The device 600 for controlling glasses includes:

a processor 601; and a memory 602 for storing instructions executable by the processor.

The processor 601 is configured to:

acquire positioning information of a user wearing the glasses and naked eye visual acuity values of the user;

determine target diopters of lenses of the glasses according to the naked eye visual acuity values of the user and the positioning information using a diopter mapping table, the lenses being used to correct the user's visual acuity, and the diopter mapping table being a preset corresponding relationship among positioning information, naked eye visual acuity values and target diopters; and adjust diopters of the lenses to the target diopters.

In one embodiment, the above processor 601 may be further configured to:

acquire environment feature information of the user's current location; and determine the target diopters of the lenses of the glasses according to the naked eye visual acuity values of the user and the positioning information of the user using the diopter mapping table when the environment feature information matches with the positioning information of the user.

In one embodiment, the above processor 601 may be further configured to:

control a camera of the glasses to capture an environment image of the user's current location, and analyze the environment image to obtain the environment feature information of the user's current location; or control a camera of a terminal of the user to capture an environment image of the user's current location, and analyze the environment image to obtain the environment feature information of the user's current location.

In one embodiment, the above processor 601 may be further configured to:

acquire the positioning information of the user with preset positioning technology. The preset positioning technology includes at least one of: positioning technology based on GPS, positioning technology based on BeiDou, positioning technology based on identification of the current location area of the user's terminal, positioning technology based on AP, and positioning technology based on base stations.

In the device for controlling glasses provided by the above embodiment of the present disclosure, the diopters of the lenses of the glasses may be automatically adjusted based on the positioning information of the user. It may meet the different demands of the users on the diopters of lenses of glasses in different environments and solve the problem that the user has to prepare glasses of different diopters for different environments. It is convenient and economical. Moreover, the process of adjusting the diopters of the glasses may be performed at highly automatic level and without human intervention. Thus, it may improve the user experience.

With respect to the devices in the above embodiments, the specific manners for performing operations for individual modules therein have been described in detail in the embodiments regarding the related methods, which will not be elaborated herein.

Figure 7:
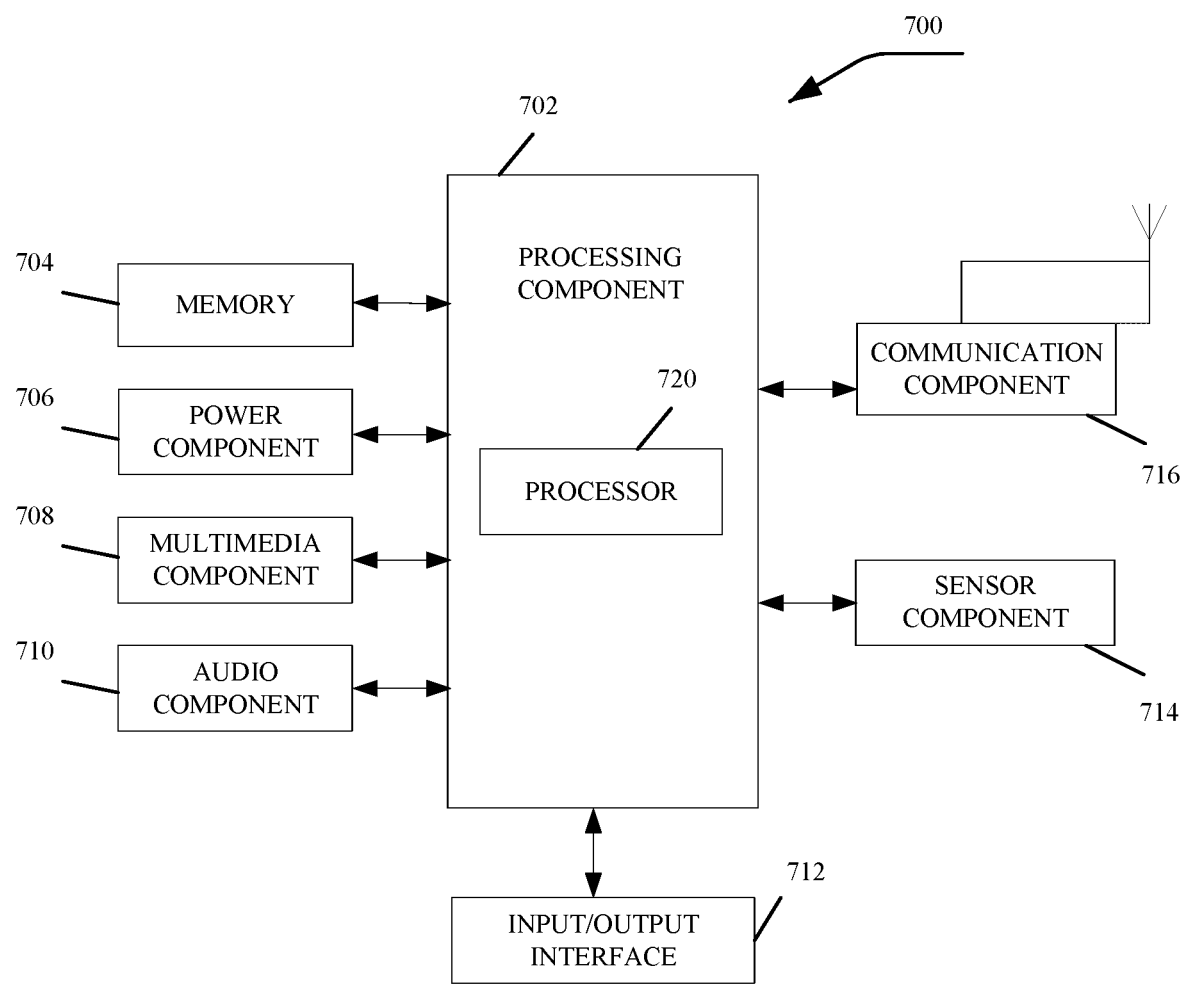
FIG. 7 is a block diagram illustrating a device for controlling glasses according to an exemplary embodiment.

FIG. 7 is a block diagram illustrating a device 700 for controlling glasses according to an exemplary embodiment. For example, the device 700 for controlling glasses may be a smart phone, a tablet, glasses, a wearable device or a vehicle-mounted mobile terminal, and the like.

Referring to FIG. 7, the device 700 for controlling glasses can include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the device 700 for controlling glasses, such as the operations associated with display, telephone calls, data communications, camera operations, and recording operations. The processing component 702 can include one or more processors 720 to execute instructions to perform all or part of the steps in the above described methods. Moreover, the processing component 702 can include one or more modules which facilitate the interaction between the processing component 702 and other components. For instance, the processing component 702 can include a multimedia module to facilitate the interaction between the multimedia component 708 and the processing component 702.

The memory 704 is configured to store various types of data to support the operation of the device 700 for controlling glasses. Examples of such data include instructions for any applications or methods operated on the device 700 for controlling glasses, contact data, phonebook data, messages, pictures, video, etc. The memory 704 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700 for controlling glasses. The power component 706 can include a power management system, one or more power sources, and any other components associated with the generation, management, and distribution of power in the device 700 for controlling glasses.

The multimedia component 708 includes a screen providing an output interface between the device 700 for controlling glasses and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 708 includes a front camera and/or a rear camera. The front camera and/or the rear camera can receive external multimedia data while the device 700 for controlling glasses is in an operation mode, such as a photographing mode or a video mode. Each of the front camera and the rear camera can be a fixed optical lens system or have focus and optical zoom capability.

The audio component 710 is configured to output and/or input audio signals. For example, the audio component 710 includes a microphone ("MIC") configured to receive an external audio signal when the device 700 for controlling glasses is in an operation mode, such as a call mode, a recording mode, and a voice recognition mode. The received audio signal can be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons can include, but are not limited to, a home button, a volume button, a starting button, and a locking button.

The sensor component 714 includes one or more sensors to provide status assessments of various aspects of the device 700 for controlling glasses. For instance, the sensor component 714 can detect an on/off status of the device 700 for controlling glasses, relative positioning of components, e.g., the display and the keypad of the device 700 for controlling glasses. The sensor component 714 can also detect a change in position of the device 700 for controlling glasses or a component of the device 700 for controlling glasses, a presence or absence of user contact with the device 700 for controlling glasses, an orientation or an acceleration/deceleration of the device 700 for controlling glasses, and a change in temperature of the device 700 for controlling glasses. The sensor component 714 can include a proximity sensor configured to detect the presence of nearby objects without any physical contact. The sensor component 714 can also include a light sensor, such as a CMOS or CCD image sensor, for use in imaging applications. In some embodiments, the sensor component 714 can also include an accelerometer sensor, a gyroscope sensor, a magnetic sensor, a pressure sensor, or a temperature sensor.

The communication component 716 is configured to facilitate communication, wired or wirelessly, between the device 700 for controlling glasses and other devices. The device 700 for controlling glasses can access a wireless network based on a communication standard, such as WiFi, 2G, 3G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the device 700 for controlling glasses can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 704, executable by the processor 720 in the device 700 for controlling glasses, for performing the above-described methods. For example, the non-transitory computer-readable storage medium can be a ROM, a RAM, a CD-ROM, a magnetic tape, a floppy disc, an optical data storage device, and the like.

A non-transitory computer readable storage medium, when instructions in the storage medium are executed by a processor of the device 700 for controlling glasses, enables the device 700 for controlling glasses to perform the following method for controlling glasses. The method includes:

acquiring positioning information of a user wearing the glasses and naked eye visual acuity values of the user;

determining target diopters of lenses of the glasses according to the naked eye visual acuity values of the user and the positioning information of the user using a diopter mapping table, the lenses being used to correct the user's visual acuity, and the diopter mapping table being a preset corresponding relationship among positioning information, naked eye visual acuity values and target diopters; and adjusting diopters of the lenses to the target diopters.

In one embodiment, determining target diopters of lenses of the glasses according to the naked eye visual acuity values of the user and the positioning information of the user using a diopter mapping table includes:

acquiring environment feature information of the user's current location; and determining the target diopters of the lenses of the glasses according to the naked eye visual acuity values of the user and the positioning information of the user using the diopter mapping table when the environment feature information matches with the positioning information of the user.

In one embodiment, acquiring environment feature information of the user's current location includes:

controlling a camera of the glasses to capture an environment image of the user's current location, and analyzing the environment image to obtain the environment feature information of the user's current location; or controlling a camera of a terminal of the user to capture an environment image of the user's current location, and analyzing the environment image to obtain the environment feature information of the user's current location.

In one embodiment, acquiring positioning information of a user wearing the glasses includes:

acquiring the positioning information of the user with preset positioning technology, and the preset positioning technology includes at least one of: positioning technology based on GPS, positioning technology based on BeiDou, positioning technology based on identification of the current location area of the user's terminal, positioning technology based on wireless access point AP, and positioning technology based on base stations.

Figure 8:
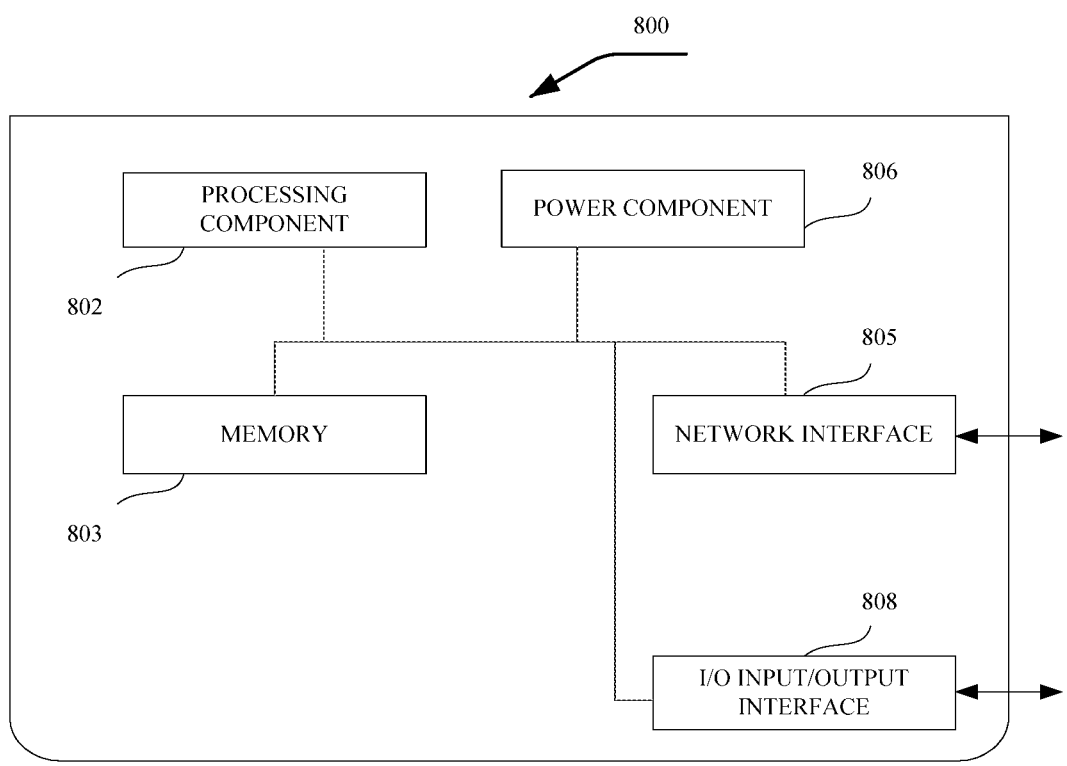
FIG. 8 is a block diagram illustrating a device for controlling glasses according to an exemplary embodiment.

FIG. 8 is a block diagram illustrating a device 800 for controlling glasses according to an exemplary embodiment. For example, the device 800 for controlling glasses may be provided as a server. The device 800 for controlling glasses includes a processing component 802 that further includes one or more processors, and memory resources represented by a memory 803 for storing instructions executable by the processing component 802, such as application programs. The application programs stored in the memory 803 may include one or more modules each corresponding to a set of instructions. Further, the processing component 802 is configured to execute the instructions to perform the above described methods.

The device 800 for controlling glasses may also include a power component 806 configured to perform power management of the device 800 for controlling glasses, wired or wireless network interface(s) 805 configured to connect the device 800 for controlling glasses to a network, and an input/output (I/O) interface 808. The device 800 for controlling glasses may operate based on an operating system stored in the memory 803, such as Windows Server™, Mac OS X™, Unix™, Linux™, FreeBSD™, or the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for controlling glasses, comprising:

acquiring positioning information of a user wearing the glasses and naked eye visual acuity values of the user, wherein the positioning information of the user indicates whether the user is currently indoor or outdoor;

determining target diopters of lenses of the glasses according to the naked eye visual acuity values of the user and the positioning information of the user using a diopter mapping table, wherein the lenses are used to correct the user's visual acuity, and the diopter mapping table is a preset corresponding relationship among positioning information, naked eye visual acuity values and target diopters; and adjusting diopters of the lenses to the target diopters, wherein:

the target diopters corresponding to the positioning information indicating that the user is currently indoor is lower than standard diopters which are determined in optometry and correspond to the naked eye visual acuity values of the user; and the target diopters corresponding to the positioning information indicating that the user is currently outdoor is higher than the standard diopters.

2. The method according to claim 1, wherein determining target diopters of lenses of the glasses according to the naked eye visual acuity values of the user and the positioning information of the user using a diopter mapping table comprises:

acquiring environment feature information of the user's current location; and determining the target diopters of the lenses of the glasses according to the naked eye visual acuity values of the user and the positioning information of the user using the diopter mapping table when the environment feature information matches with the positioning information of the user.

3. The method according to claim 2, wherein acquiring environment feature information of the user's current location comprises:

controlling a camera of the glasses to capture an environment image of the user's current location, and analyzing the environment image to obtain the environment feature information of the user's current location; or controlling a camera of a terminal of the user to capture an environment image of the user's current location, and analyzing the environment image to obtain the environment feature information of the user's current location.

4. The method according to claim 1, wherein acquiring positioning information of a user wearing the glasses comprises:

acquiring the positioning information of the user with preset positioning technology, wherein the preset positioning technology comprises at least one of: positioning technology based on Global Positioning System GPS, positioning technology based on BeiDou, positioning technology based on identification of the current location area of the user's terminal, positioning technology based on wireless access point AP, and positioning technology based on base stations.

5. A device for controlling glasses, comprising:

a processor; and a memory for storing instructions executable by the processor, wherein the processor is configured to:
acquire positioning information of a user wearing the glasses and naked eye visual acuity values of the user, wherein the positioning information of the user indicates whether the user is currently indoor or outdoor;
determine target diopters of lenses of the glasses according to the naked eye visual acuity values of the user and the positioning information of the user using a diopter mapping table, wherein the lenses are used to correct the user's visual acuity, and the diopter mapping table is a preset corresponding relationship among positioning information, naked eye visual acuity values and target diopters; and
adjust diopters of the lenses to the target diopters, wherein:
the target diopters corresponding to the positioning information indicating that the user is currently indoor is lower than standard diopters which are determined in optometry and correspond to the naked eye visual acuity values of the user; and
the target diopters corresponding to the positioning information indicating that the user is currently outdoor is higher than the standard diopters.

6. The device according to claim 5, wherein the processor is further configured such that determining target diopters of lenses of the glasses according to the naked eye visual acuity values of the user and the positioning information of the user using a diopter mapping table comprises:
acquiring environment feature information of the user's current location; and
determining the target diopters of the lenses of the glasses according to the naked eye visual acuity values of the user and the positioning information of the user using the diopter mapping table when the environment feature information matches with the positioning information of the user.

7. The device according to claim 6, wherein the processor is further configured such that acquiring environment feature information of the user's current location comprises:
controlling a camera of the glasses to capture an environment image of the user's current location, and analyzing the environment image to obtain the environment feature information of the user's current location; or
controlling a camera of a terminal of the user to capture an environment image of the user's current location, and analyzing the environment image to obtain the environment feature information of the user's current location.

8. The device according to claim 5, wherein the processor is further configured such that acquiring positioning information of a user wearing the glasses comprises:
acquiring the positioning information of the user with preset positioning technology, wherein the preset positioning technology comprises at least one of: positioning technology based on Global Positioning System GPS, positioning technology based on BeiDou, positioning technology based on identification of the current location area of the user's terminal, positioning technology based on wireless access point AP, and positioning technology based on base stations.

9. A non-transitory computer readable storage medium having stored thereon computer programs that, when being executed by a processor, cause the processor to perform a method for controlling glasses, the method comprising:
acquiring positioning information of a user wearing the glasses and naked eye visual acuity values of the user, wherein the positioning information of the user indicates whether the user is currently indoor or outdoor;
determining target diopters of lenses of the glasses according to the naked eye visual acuity values of the user and the positioning information of the user using a diopter mapping table, wherein the lenses are used to correct the user's visual acuity, and the diopter mapping table is a preset corresponding relationship among positioning information, naked eye visual acuity values and target diopters; and
adjusting diopters of the lenses to the target diopters, wherein:
the target diopters corresponding to the positioning information indicating that the user is currently indoor is lower than standard diopters which are determined in optometry and correspond to the naked eye visual acuity values of the user; and
the target diopters corresponding to the positioning information indicating that the user is currently outdoor is higher than the standard diopters.

10. The storage medium according to claim 9, wherein determining target diopters of lenses of the glasses according to the naked eye visual acuity values of the user and the positioning information of the user using a diopter mapping table comprises:
acquiring environment feature information of the user's current location; and
determining the target diopters of the lenses of the glasses according to the naked eye visual acuity values of the user and the positioning information of the user using the diopter mapping table when the environment feature information matches with the positioning information of the user.

11. The storage medium according to claim 10, wherein acquiring environment feature information of the user's current location comprises:
controlling a camera of the glasses to capture an environment image of the user's current location, and analyzing the environment image to obtain the environment feature information of the user's current location; or
controlling a camera of a terminal of the user to capture an environment image of the user's current location, and analyzing the environment image to obtain the environment feature information of the user's current location.

12. The storage medium according to claim 9, wherein when acquiring positioning information of a user wearing the glasses comprises:
acquiring the positioning information of the user with preset positioning technology, wherein the preset positioning technology comprises at least one of: positioning technology based on Global Positioning System GPS, positioning technology based on BeiDou, positioning technology based on identification of the current location area of the user's terminal, positioning technology based on wireless access point AP, and positioning technology based on base stations.

* * * * *